United States Patent [19]
Nagle et al.

[11] Patent Number: 5,415,147
[45] Date of Patent: May 16, 1995

[54] SPLIT TEMPERATURE REGULATING SYSTEM AND METHOD FOR TURBO CHARGED INTERNAL COMBUSTION ENGINE

[75] Inventors: Jan A. Nagle, North East; Myron L. Smith, Fairview; Gregory A. Marsh, Erie, all of Pa.

[73] Assignee: General Electric Company, Erie, Pa.

[21] Appl. No.: 175,208

[22] Filed: Dec. 23, 1993

[51] Int. Cl.⁶ .............................................. F02B 33/00
[52] U.S. Cl. ...................................... 123/563; 60/599; 123/41.29; 123/41.31
[58] Field of Search .................. 123/41.29, 41.31, 593; 60/599

[56] References Cited

U.S. PATENT DOCUMENTS

| | | | |
|---|---|---|---|
| 4,207,848 | 6/1980 | Dinger et al. | 60/599 |
| 4,517,929 | 5/1985 | Musick et al. | 60/599 |
| 4,546,742 | 10/1985 | Sturges | 60/599 |
| 5,201,285 | 4/1993 | McTaggert | 123/41.29 |

*Primary Examiner*—Richard A. Bertsch
*Assistant Examiner*—Charles G. Freay
*Attorney, Agent, or Firm*—Jill M. Breedlove; Marvin Snyder

[57] ABSTRACT

A temperature regulating system for a turbo charged engine and the compressed charging air from the turbo charger is disclosed. The heat regulating system employs coolant fluid which flows through the engine to transfer heat from the engine. Depending on the operating conditions of the engine the heated coolant from the engine is distributed among one or more of a plurality of flow paths. In one of the flow paths the coolant flows through a primary radiator where the coolant is cooled. A fan forces air into contact with the radiator to transfer heat from the radiator. A portion of the coolant exiting the radiator flows through a subcooler where the coolant is further cooled. The coolant from the subcooler may be directed to the charged air cooler for cooling the compressed air before flowing back to the engine. In a second flow path, coolant which has not flowed through the radiator, flows through the charged air cooler to heat the compressed air. A controller responds to input from at least one sensing device and actuates a valving arrangement to distribute the coolant from the engine among the flow paths.

18 Claims, 17 Drawing Sheets

Fig. 9

| AMBIENT STRATEGY | LOW | HIGH | LOW | HIGH |
|---|---|---|---|---|
| NOTCH STRATEGY | LOW | HIGH | LOW | HIGH |
| CONTROL TEMPS °F | | | | |
| T1 | 182 | 180 | 175 | 172 |
| T2 | 188 | 185 | 182 | 175 |
| T3 | 192 | 190 | 185 | 182 |
| T4 | 183 | 182 | 175 | 170 |
| T5 | 178 | 177 | 170 | 166 |
| T6 | 173 | 173 | 166 | 164 |
| T7 | 200 | 200 | 179 | 172 |
| T8 | 180 | 170 | 173 | 170 |
| T9 | 195 | 195 | 167 | 163 |
| T10 | 170 | 160 | 163 | 160 |

SPLIT TEMPERATURE REGULATING SYSTEM AND METHOD FOR TURBO CHARGED INTERNAL COMBUSTION ENGINE

FIELD OF THE INVENTION

The present invention relates to coolant systems for internal combustion engines which utilize a turbo charged air intake device. In particular, the present invention relates to such a heat regulating system to independently regulate the engine temperature and the temperature of the turbo air which is provided to the engine by the turbo charger.

BACKGROUND OF THE INVENTION

Many internal combustion engines utilize turbo chargers to increase the performance of the engine. Turbo chargers increase the performance by increasing the mass flow rate of air into the air intake of the engine during operation. Turbo chargers typically operate as high speed radial compressors which increase the air pressure of the air prior to delivery of the air to the engine. The increase in air pressure also causes a temperature rise in the compressed air. After the air has been compressed, it is delivered to the intake of the engine.

To obtain maximum performance from the turbo charged air, the temperature of the air should be kept within an optimal range. If the turbo charged air is too hot, the density of the air will be reduced which increases fuel consumption. In addition, the higher air temperature will increase the piston temperatures of the engine which results in a reduction in the performance of the engine. Higher air temperature also increases nitrogen oxide exhaust emissions. Also, the lower density caused by the higher temperature will reduce the power level in the engine because of the lower amount of air in the piston. However, if the turbo charged compressed air is too cool, the engine produces increased visible and other emissions.

Also, the operating temperature of the engine should also be kept within a desired range. Systems for regulating engine temperature typically employ a system which circulates coolant through the engine to transfer heat from the engine to the coolant and then circulates the coolant through a radiator to cool the coolant before the coolant is circulated back into the engine. The coolant system may also employ fans which blow air across the radiators to improve the ability of the radiators to remove heat from the coolant.

However, during certain operating conditions, such as when the ambient air temperature is very low and the engine is operating at a low power output, if the coolant is circulated through the radiator the temperature of the coolant may be lowered to such a degree that when the coolant is circulated back through the engine, the engine is cooled to a temperature below it's optimal level.

To overcome this drawback in a loop system, it is known to utilize a system where when the sensed ambient temperature is too low and the engine is operating at low speeds, the coolant is circulated through an alternate path so that the coolant will not flow through the radiator. However, the radiator must be drained during this alternate condition to prevent the coolant in the radiator from freezing, which may damage the radiator. Systems which route the circulation of the coolant around the radiator and drain the radiators are referred to as wet/dry systems.

Frequently, the same coolant system circulates the coolant through an air cooler to reduce the temperature of the turbo charged air prior to the introduction of the air into the engine. If, however, the engine is operating at higher power outputs and the ambient temperature is high, the coolant will not be cooled, by passage through the radiator, to a temperature which adequately removes the heat from the turbo charged air. Thus, the air temperature of the turbo charged air will be higher than the optimal range.

On the other hand, when the engine is operating at a low ambient condition and/or at low power levels, the temperature of the coolant may so low that it causes the air coolers to cool the turbo charged air below it's optimal temperature range.

U.S. Pat. No. 5,201,285 to McTaggart discloses a Cooling System for a Turbo Charged Internal Combustion Engine which lowers the temperature of the coolant below the temperature of the coolant provided to the engine. In the disclosed system, the temperature of the coolant provided to the air cooler may be routed through an additional sub-cooler. In the disclosed preferred embodiment, the sub-cooler is disposed beneath the radiator and air is blown through the sub-cooler and radiator.

The disclosed system, however, has several drawbacks. One of the drawbacks is that when there is a low ambient temperature and the engine is operating at medium power levels, the air cooler coolant may be cooled to too low a temperature by the sub-cooler. When the coolant passes through the air cooler, the charged air may become too cool thus resulting in visible emissions.

An additional drawback is that when the ambient air temperature is low and the engine is operating at low temperatures, the coolant provided to the engine may be cooled to such a low degree that it causes the engine to run below the optimal range. Although the system does disclose a control valve which allows a portion of the coolant provided to the radiator to be routed around the radiator, there may be operating conditions where allowing even a limited flow through the radiator would cause the temperature of the coolant to become too low.

If, however, the disclosed system were to be modified so that in certain operating conditions, no flow of coolant flows through the radiator, then the stagnant coolant in the radiator may cause corrosion of the radiator and/or damage to the radiator if that coolant freezes.

Accordingly, it is an object of the present invention to provide a temperature regulating system to regulate the temperature of a turbo charged engine and the compressed air from the turbo charger being provided to the engine.

It is a further object of the present invention to provide a temperature regulating system for maintaining the operating temperature of the engine in a desired optimal range. A related object of the present invention is to provide a temperature regulating system for maintaining the temperature of the compressed air, provided by the turbo charger to the engine, in a desired optimal range.

It is another object of the present invention to provide a temperature regulating system in which a portion of the coolant from the engine which passes through the radiator is further cooled so that the air temperature of the compressed air from the turbo charger will be maintained in an optimal range.

A still further object of the present invention is to provide a heat regulating system in which heated coolant from the engine may be utilized to heat the compressed air from the turbo charger.

Yet another object of the present invention is to provide a heat regulating system in which under certain operating conditions the flow of coolant from the engine is circulated back to the engine without passing through the primary radiator. A related object is to provide such a system in which the radiator is drained when there is no flow of coolant through the radiator.

SUMMARY OF THE INVENTION

Accordingly a temperature regulating system for a turbo charged engine and the compressed charging air from the turbo charger is disclosed. The heat regulating system employs coolant fluid which flows through the engine to transfer heat from the engine. Depending on the operating conditions of the engine the heated coolant from the engine is distributed among one or more of a plurality of flow paths. In one of the flow paths, the coolant flows through a primary radiator where the coolant is cooled. A fan forces air into contact with the radiator to transfer heat from the radiator. A portion of the coolant exiting the radiator flows through a subcooler where the coolant is further cooled. The coolant from the subcooler may be directed to the charged air cooler for cooling the compressed air before flowing back to the engine.

In a second flow path, coolant does not flow through the radiator but instead bypasses the radiator and flows through the charged air cooler to heat the compressed air.

A controller responds to input from at least one sensing device and provides control signal output that actuates a valving arrangement to distributes the coolant from the engine among the flow paths.

More particularly, to control the temperature of the coolant so that the temperature of the engine is maintained in an optimal range, a first three way valve arrangement regulates the flow of the coolant between the engine and the radiator. The heat regulating system also includes a second three way valve arrangement to regulate the temperature of the compressed air flowing through the charged air cooler. The second valve arrangement may be actuated to either regulate a flow of coolant between the engine and the air cooler without the second flow flowing through the radiator to heat the compressed air flowing through the charged air cooler or actuated to regulate a flow of coolant from the subcooler to the charged air cooler to cool the compressed air flowing through the charged air cooler.

The controller provides a control signal to actuate the second three way valve arrangement in response to the temperature of the coolant at a predetermined location along the heat regulating system. The controller may also be adapted to provide a control signal to actuate the first valve arrangement so that the flow of coolant between the engine and regulator is regulated in response to the temperature of the coolant at a predetermined location along the heat regulating system.

BRIEF DESCRIPTION OF THE DRAWINGS

FIG. 9 is a chart of control temperatures set by the controller for the Ambient and Notch Strategies.

DESCRIPTION OF THE PREFERRED EMBODIMENTS

Figure 1:
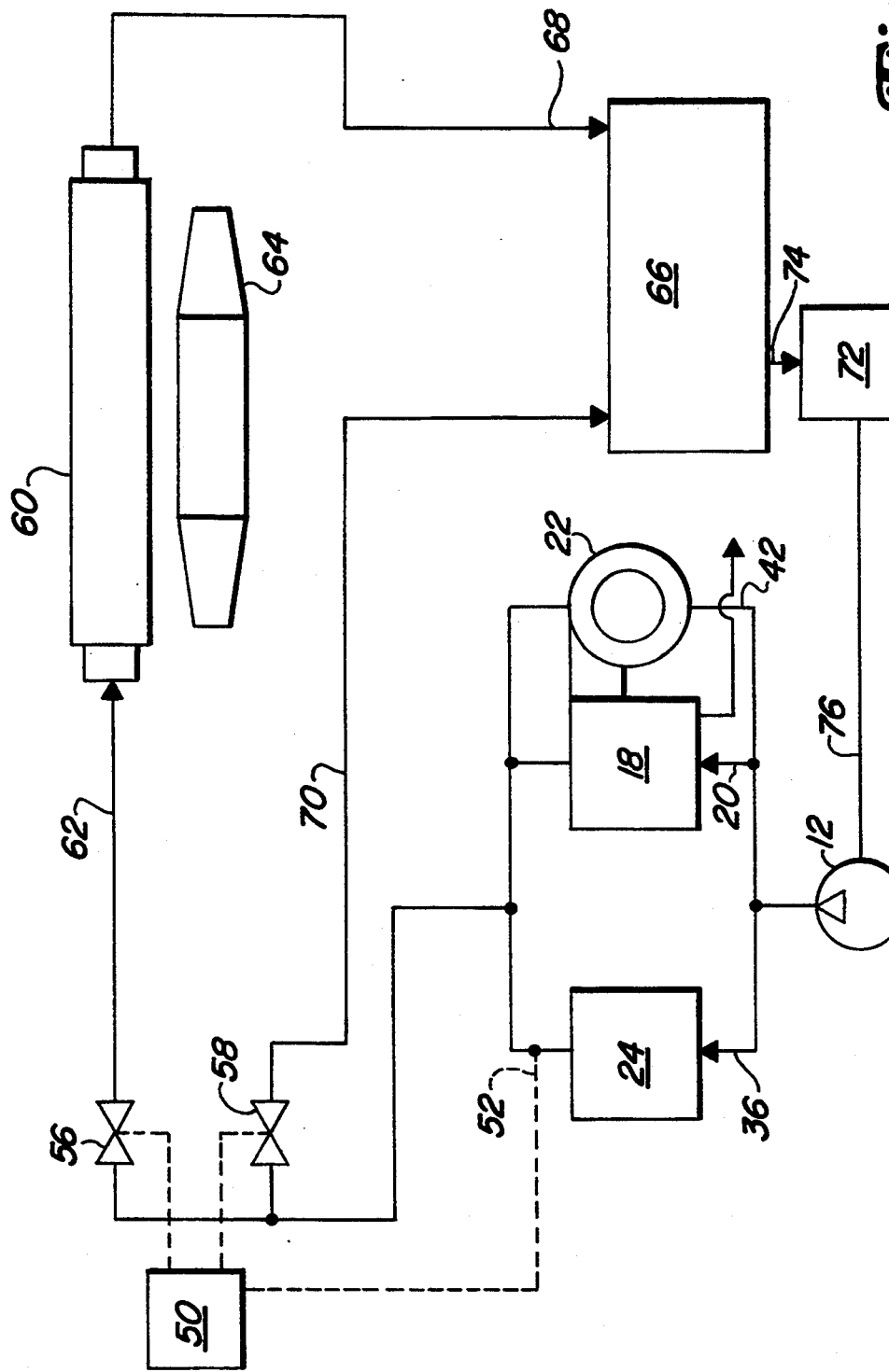
FIG. 1 illustrates a diagram of a typical wet-dry cooling system for a turbo charged internal combustion engine.

Referring to FIG. 1, a diagram illustrates the flows and flow paths of a typical cooling system having wet and dry system modes for a turbo charged locomotive diesel engine. Coolant such as water or other medium is discharged from pump 12 and may be divided with a portion of the coolant conducted to a charger air cooler 18 as indicated by arrow 20. As is well known, the air cooler 18 cools the air which is discharged from turbo charger 22 before the air reaches the intake of engine 24.

That portion of the coolant which does not flow to the air cooler 18 may be divided and conducted through the engine 24 as indicated by arrow 36 or through the turbo charger 22 as indicated by arrow 42. As the coolant flows through the engine 24 and turbo charger 22, the coolant increases in temperature by removing heat from the two devices. The coolant is then discharged from the engine 24 and turbo charger 22 and combines with the coolant flowing from the air cooler 18.

A controller 50 determines whether the system 10 is to be operated in the wet mode or dry mode typically in dependence on the temperature of the coolant at specific locations in the system. The temperature of the coolant being sensed by appropriately located temperature sensors. Generally, a temperature sensor 52 is located so as to sense the temperature of the coolant flowing from the engine 24.

If the controller 50 determines that the system 10 is to operate in the wet mode, a first valve is opened 56, a second valve 58 is closed. The coolant flows through the first valve and is conducted to the radiator 60 as indicated by arrow 62. As the coolant flows through the radiator 60, the coolant is cooled by the radiator which is in turn cooled by ambient air which is forced through the radiator by fan 64. The coolant then flows from the radiator 50 to a coolant tank 66 as indicated by arrow 68.

If instead the controller 50 determines that the system 10 is to operate in the dry mode, the controller closes the first valve 56 and the second valve 58 is opened.

Coolant then flows through the second valve 58 and is conducted directly to the coolant tank 66 as indicated by arrow 70.

The system 10 will typically operate in the wet mode when heat must be conducted away from the engine 24 to prevent overheating. The system 10 will typically operate in the dry mode when little if any heat must be conducted away from the engine 24 to prevent overheating. If the system is operating in the dry mode, coolant drains from the radiator 60 into the coolant tank 66 until the radiator is dry. The radiator 60 is drained to prevent freezing of the coolant in the radiator which may cause corrosion or damage to the radiator.

Whether the system 10 is operating in the wet mode or dry mode, the coolant which has been conducted into the coolant tank 66 is then conducted to the oil cooler 72 as indicate by arrow 74. Within the oil cooler 72, the coolant cools the oil flowing through the oil cooler thereby causing a rise in the temperature of the coolant. From the oil cooler 72, the coolant is conducted to the suction of the pump 12 as indicate by arrow 76 thus completing the circulation of the system 10.

Figure 2:
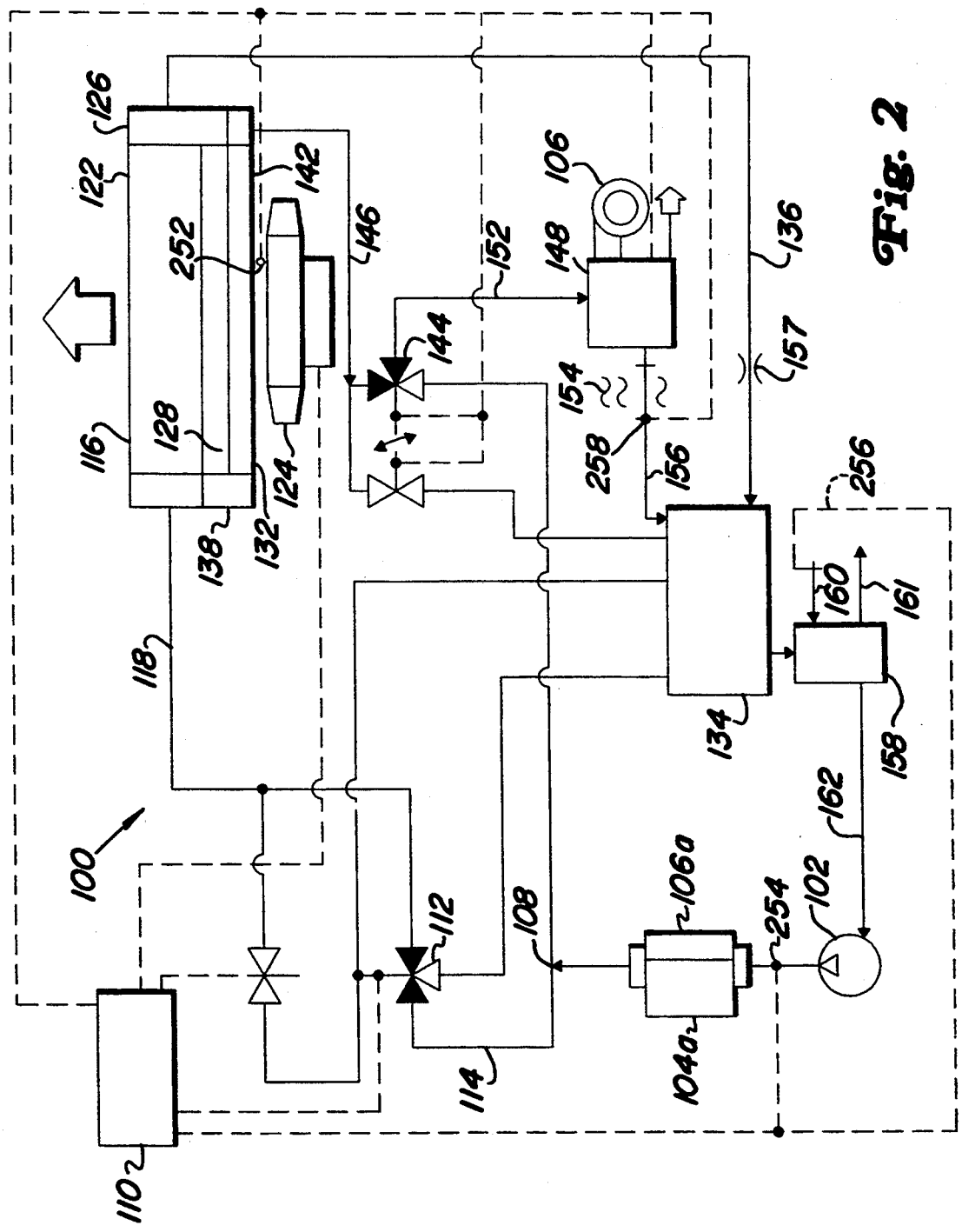
FIG. 2 is a diagram of a split heat regulating system constructed in accordance with the present invention illustrating the operational flows of the system in a wet mode of operation.
Figure 3:
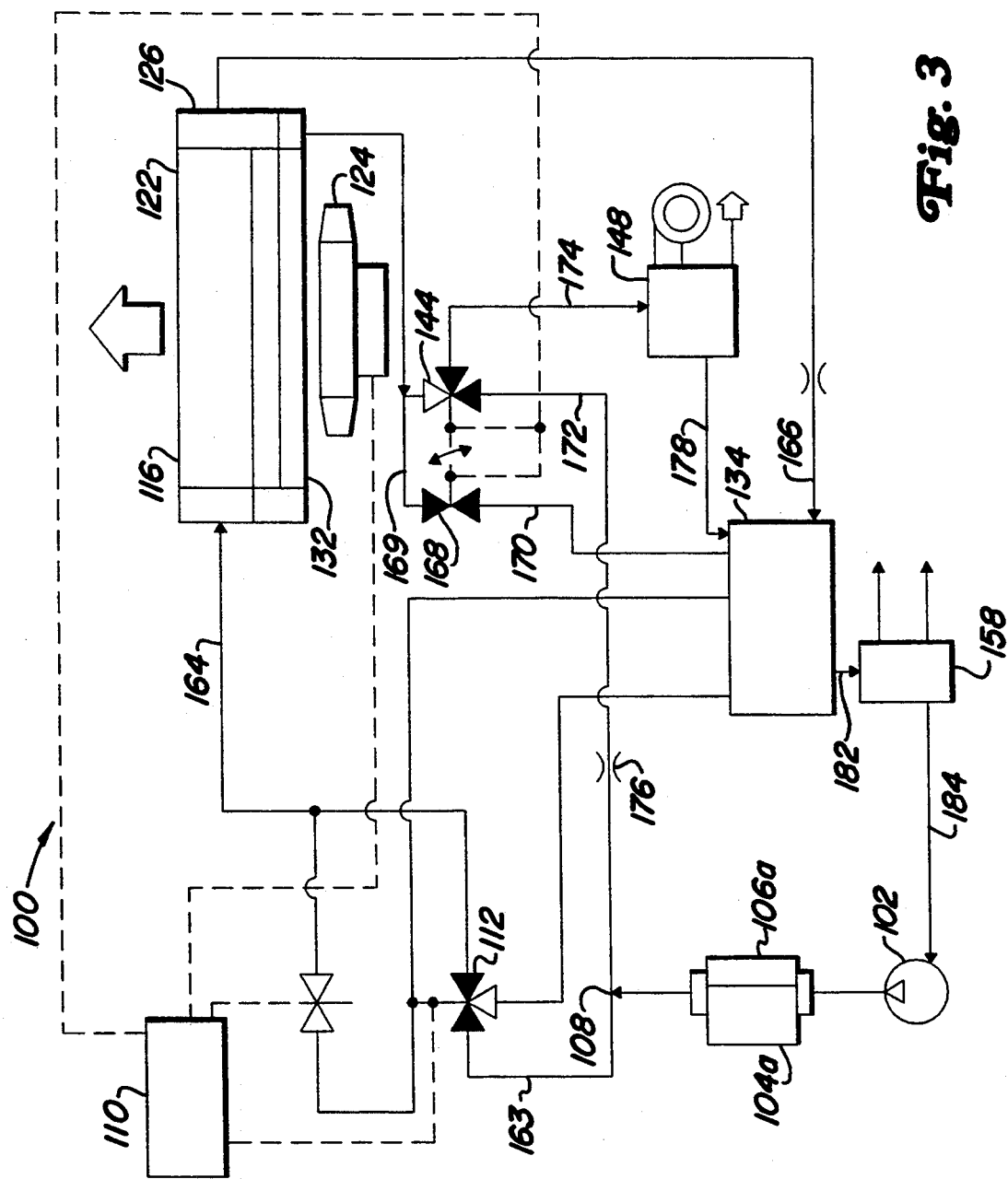
FIG. 3 is a diagram of a split heat regulating system constructed in accordance with the present invention illustrating the operational flows of the system in a split mode of operation.
Figure 4:
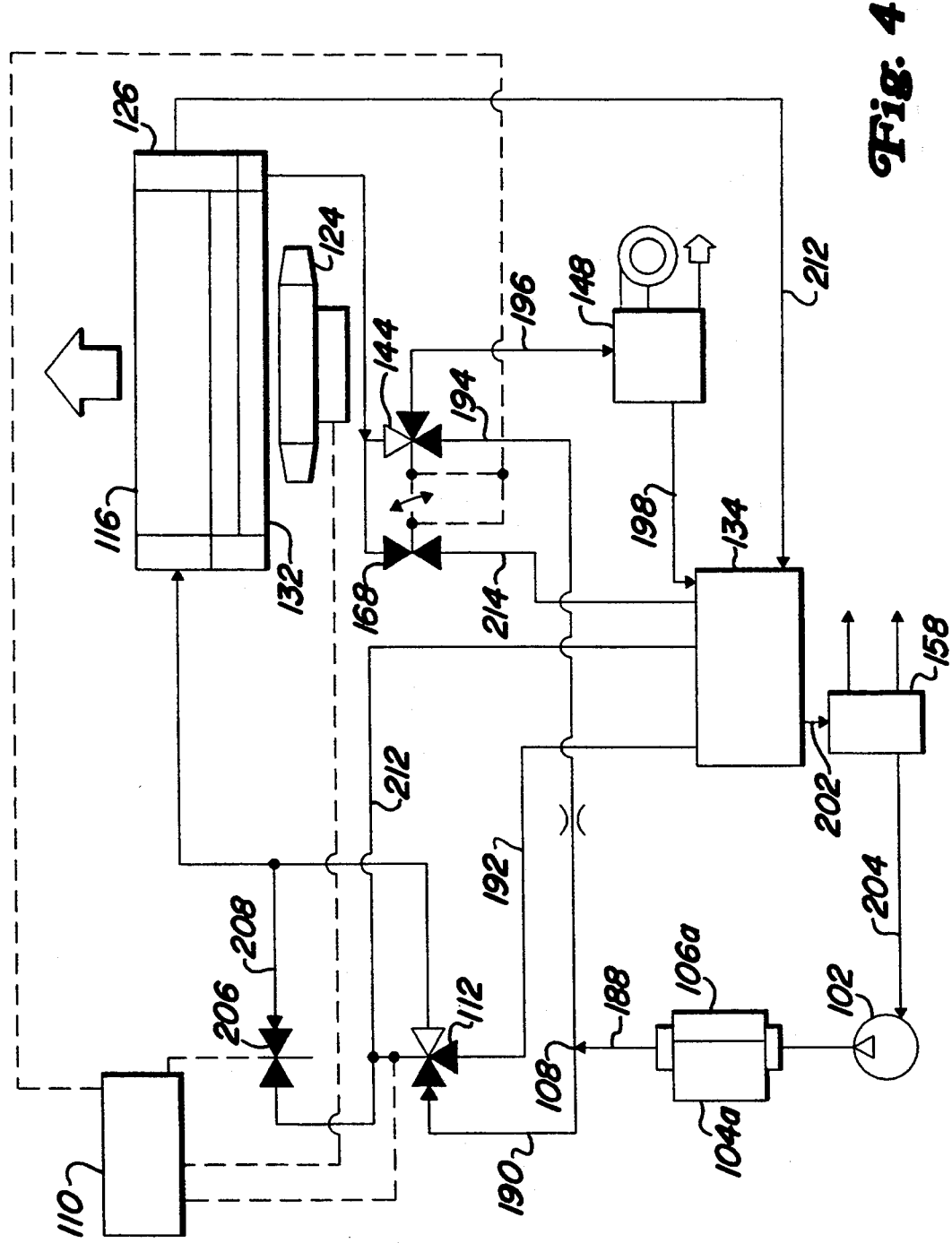
FIG. 4 is a diagram of a split heat regulating system constructed in accordance with the present invention illustrating the operational flows of the system in a dry mode of operation.

Referring to FIGS. 2, 3 and 4, diagrammatic illustrations show a plurality of flows and flow paths of a split heat regulating system 100, according to the preferred embodiment of the invention, operating under wet, split and dry modes, respectively. Whether the system is in the wet, dry or split mode, coolant is conducted from the discharge of a pump 102 into an engine cooling circuit 104a and turbo charger cooling circuit 106a. As coolant such as water flows through the engine circuit 104a and turbo charger circuit 106a, the engine 104 and turbo charger 106 are cooled by transferring heat to the flowing coolant. The coolant in turn rises in temperature. The coolant is then conducted from the engine 104 and turbo charger 106 to a T junction 108 as indicated by arrow 109.

If a controller assembly, generally indicated at 110, sets the system 100 in the wet mode, the flow of coolant from the engine 104 is distributed along a first flow path as illustrated in FIG. 2. In the first flow path, coolant is conducted from the T junction to a first three-way valve 112 as indicated by arrow 114. The controller 110 provides a control signal to actuate or orient the valve 112 so that the coolant is conducted through the valve and onward to a split cooling radiator 116 as indicated by arrow 118.

The split radiator 116 includes an upper primary radiator 122 through which the coolant flows when the coolant first reaches the split radiator. As the coolant flows through the primary radiator 122, the coolant is cooled by exchanging heat with the primary radiator. The primary radiator 122 is in turn cooled by ambient air which is blown through the primary radiator by a fan 124.

After flowing through the primary radiator 122 the flow of coolant is distributed into two separate flows along two separate flow paths. The dividing is done within a rearward end manifold 126 of the cooling radiator 116 into which the coolant flows from the primary radiator 122. From the end manifold 126, a portion of the coolant flows into an upper section 128 of a lower sub-cooler 132. The remaining portion of coolant flows from the end manifold 126 of the radiator 116 to a coolant tank 134 as indicated by arrow 136.

The portion of coolant flows through the upper section 128 of the sub-cooler 132, into a forward end manifold 138 and then back through a lower section 142 of the sub-cooler 132. In the preferred embodiment, the lower section 142 is parallel to and juxtaposed beneath the upper section 128. The sub-cooler 132 is in turn parallel with and juxtaposed beneath the primary radiator 122 so that the fan 124 forces the ambient air initially through the lower section 142, then through the upper section 128 and finally through the primary radiator 122.

The arrangement of the sub-cooler 132 below the primary radiator 122 allows the air from the fan 124 to first flow through the sub-cooler. Because the ambient air has not passed through a heated radiator, the temperature of the air flowing through the subcooler 132 is near ambient temperature. After the air flows through the subcooler, the temperature of the air, which then flows across the primary radiator 122, increases due to the heat absorbed from the subcooler 132. Also the coolant flowing into the subcooler 132 has already been cooled by passage through the primary radiator 122. Thus, the coolant flowing through the subcooler 132 is cooled below the temperature of the coolant flowing out of the primary radiator 132.

As set forth below, the controller 110 provides a control signal to operate the fan 124 at a number of discrete speeds to vary the flow of air forced through the cooling radiator 116. By varying the flow of air, the amount of heat transferred from the coolant to the radiator 116 may be varied, and thus the cooling of the coolant flowing through the radiator is varied.

The coolant then exits the lower section 142 of the subcooler and is conducted along a flow path to a second three-way valve 144 as indicated by arrow 146. The control system 110 provides a control signal to actuate or orient the second valve 144 so that the coolant is further conducted to the charged air cooler 148 as indicated by arrow 152. As the coolant flows through the air cooler 148, the coolant cools the air 154 which has been charged by the turbo charger 106 before the air enters the inlet of the engine 104. The coolant cools the air 154 by absorbing heat from the air cooler 148 which in turn absorbs heat from the air 154 as the air is blown through the cooler.

After the coolant flows through the air cooler 148 the coolant is conducted to the coolant tank 134 as indicated by arrow 156. In the coolant tank 134, the coolant from the air cooler 148 combines with the coolant which was conducted to the tank directly from the end manifold 126 of the radiator 116.

Of the total flow of coolant from the primary radiator 122 into the rearward manifold 126, the proportional flow of coolant which is conducted along the flow path from the end manifold 126 to the coolant tank 134 relative to the proportional flow of coolant which is conducted along the flow path from the rearward manifold through the sub-cooler 132, may be controlled by various devices such as valves or orifices disposed in the flow paths. In the preferred embodiment, the proportional flows are set by selected design of the components and connecting piping along the flow paths in such a manner so that predetermined pressure drops are designed into the system. This design of predetermined pressure drops is illustrated by symbol 157. By controlling the proportional flow with selecting components to achieve selective pressure drops across the flow paths, flow control devices which may be subject to failure are eliminated.

The coolant which is collected in the coolant tank 134 is then conducted through an oil cooler 158. Within the oil cooler 158, the coolant cools the oil which flows into the oil cooler as indicated by arrow 160, circulates through the cooler and flows out of the oil cooler as indicated by arrow 161. The coolant then flows from the oil cooler 158 to the suction of the pump 102 in which the coolant is pressurized and discharged thereby completing the flow of the wet system as indicated by arrow 162.

FIG. 3 diagrammatically illustrates the heat regulating system 100 when the controller 110 distributes the flow of coolant along flow paths defining the split heat regulating mode. When the system 100 is operating in the split mode, the coolant which is conducted from the engine cooling circuit 104a and turbo charger cooling circuit 106a is separated or split among two flow paths. In the split mode, the controller 110 provides a control signal to orient the first three-way valve 112 so that a portion of the coolant flows from the T Junction 108 through the first three-way valve as indicated by arrow 163. The coolant is then conducted from the first three-way valve 112 to the cooling radiator 116 as indicated by arrow 164. The coolant then flows through the primary radiator 122 and into the rearward manifold 126. As in the wet mode, a portion of the coolant flowing into the rearward manifold 126 flows from the rearward manifold into the coolant tank 134 as indicated by arrow 166. The remaining portion of the liquid flowing into the rearward manifold 126 flows through the sub-cooler 132.

Also, as in the wet mode, the controller 110 provides a control signal to operate the fan at a number of discrete speeds to vary the flow of air forced through the cooling radiator 116. By varying the flow of air, the amount of heat transferred from the coolant to the radiator 116 may be varied, and thus the cooling of the coolant flowing through the radiator is varied.

However, in contrast to the operation of the system 100 in the wet mode, the controller 110 provides a control signal to orient the second three-way valve 144 in such a manner that the coolant from the sub-cooler cannot flow through the second three-way valve 144, and instead the controller provides a control signal to open a first two-way valve 168 so that the coolant flows from the sub-cooler 132 through the first two-way valve 168 as indicated by arrow 169 and then to the coolant tank 134 as indicated by arrow 170.

The second three-way valve 144 is oriented by a control signal from the controller 110 so that the portion of the coolant which flows to the T junction 108, but does not flow through the first three-way valve 112 and into the radiator 116, is conducted from the T junction to the second three way valve as indicated by arrow 172 and then to the charged air cooler 148 as indicated by arrow 174. In the split mode, the coolant bypasses the radiator 116 and is conducted from the engine circuit 104a and the turbo charger circuit 106a to the charge air cooler 148 so that the coolant is at a higher temperature than the charged air. Therefore, the flow of coolant through the charged air cooler 148 causes the air cooler to warm the charged air before introduction of the air 154 to the engine 104.

Thus, in the split operation, coolant which has been heating by flowing through the engine cooling circuit 104a and turbo charger cooling circuit 106a is split with a portion conducted through the composite radiator 116 for cooling. The remaining portion of the coolant being conducted through the charged air cooler 148 where the heated coolant acts to heat the charged air before introduction of the air to the engine 104.

The proportional amount of coolant which flows from the T junction 108 to the first three way valve 112 and composite radiator 116 versus the proportional amount of coolant which flows from the T junction 108 to the second three way valve and charge air cooler may be controlled by orifices, valves or the like. However, in the preferred embodiment the proportional flows are established by selective design of the connecting piping and components along the two flow paths to establish predetermined pressure drops. This selection of components to achieve a predetermined pressure drops is illustrated by symbol 176.

After flowing through the charged air cooler 148 the coolant flows to the coolant tank 134 as indicated by arrow 178. In the coolant tank, 134 the coolant flows from the subcooler 132 via the first two way valve 168 the flow from the rear manifold 126, and the flow from the charge air cooler 148, combine. The coolant then is conducted from the coolant tank 134 to the oil cooler 158 as indicated by arrow 182 and onward to the pump 102 as indicated by arrow 184 where the process is repeated.

FIG. 4, diagrammatically illustrates the heat regulating system 100 when the flow of coolant from the engine is distributed among flow paths to define the dry mode. In the dry mode, as in the split heat regulating mode, coolant flows from the engine cooling circuit 104a and the turbo charger cooling circuit 106a to the T junction 108 as indicated by arrow 188. From the T junction 108, a portion of the coolant flows to the first three way valve 112 as indicated by arrow 190. However, in contrast to the split heat regulating mode and wet modes, the controller 110 provides a control signal to orient the first three way valve 112 so that the fluid flows through the first three way valve to the coolant tank as indicated by arrow 192. Also, the orientation of the first three way valve 112 prevents coolant from flowing onward to the radiator 116.

The portion of fluid which does not flow from the T junction 108 to the first three way valve 112 flows from the T junction to the second three way valve 144, as indicated by arrow 194. The controller 110 provides a control signal to orient the second three way valve 144 so that coolant, which flows through the second three way valve, flows to the charged air cooler 148 as indicated by arrow 196. Because the coolant which flows to the cooler 148 flows directly from the engine cooling circuit 104a and charger cooling circuit 106a the coolant is warmer than the charged air and acts to warm the air 154 as it passes through the cooler 148. The coolant then flows from the charged air cooler 148 to the coolant tank as indicated by arrow 198.

In the coolant tank 134, the coolant from the charged air cooler 148 combines with the coolant being conducted from the first three way valve 112. The coolant then flows from the coolant tank 134 to the oil cooler 158 as indicated by arrow 202. From the oil cooler 158 the coolant is conducted to the pump 102 as indicated by arrow 204. From the pump, the coolant flows to the engine cooling circuit 104a and turbo charger cooling circuit 106a where the process is repeated.

As is apparent, the flow of coolant from the engine coolant circuit 104a and turbo charger cooling circuit 106a to the coolant tank 134 flows either through the first three way valve 112 to the coolant tank 134 or charged air cooler 148 to the coolant tank; and therefore, there is no flow of coolant through the composite radiator 116. To drain coolant from the radiator 116 to the coolant tank 134 the controller 110 provides a control signal to open a second two way valve 206 and a portion of the coolant in the radiator 116 drains through the second two way valve as indicated by arrow 208. From the second two way valve 206 the coolant then drains to the coolant tank as indicated by arrow 212. A portion of the coolant in the composite radiator 116 may also drain from the rear manifold 126 to the coolant tank 134 as indicated by arrow 212. To drain coolant from the subcooler, the controller 110 provides a control signal to open the first two way valve 168 so that coolant may flow from the subcooler 132 through the first two way valve to the coolant tank 134 as indicated by arrow 214.

Because there is no flow of coolant through the radiator 116, the controller 110 provides a control signal to turn off the fan 124.

Thus, in the dry mode, a portion of the coolant which is heated by being conducted through the engine 104 and turbo charger 106a is conducted through the charged air cooler 148 to heat the air 154 flowing through the cooler. The remaining portion is conducted to the coolant tank 134, and the composite radiator 116 is drained.

From the above description of the operation of the heat regulating system 100, it may be seen that the first three way valve regulates the flow of coolant from the engine 104 to the split radiator 116 by allowing the flow to be conducted to the radiator or preventing the flow to be conducted to the coolant tank. Obviously, the valve may also be configured so that the flow of coolant to the radiator 116 may be throttled down to allow a flow rate of coolant to the radiator which is intermediate a full flow rate and a zero flow rate if that is so desired.

Similarly, it is also seen that the second three way valve 144 regulates the flow of coolant from the engine 104 to the charger air cooler 148 by either preventing any flow of coolant from the engine to the charger air cooler or allowing flow from the engine to the charger air cooler. In addition, the second three way valve 144 regulates the flow of coolant from the subcooler 132 to the charger air cooler 148 by either allowing the flow from the subcooler to the charger air cooler or preventing the flow of coolant from the subcooler to the charger. Obviously the second three way valve may also be configured to regulate the flow between the engine and charger air cooler and the subcooler and charger air cooler by throttling the respective flows to allow a flow rate which is intermediate between a full flow rate and a zero flow rate if that is so desired.

Figure 5:
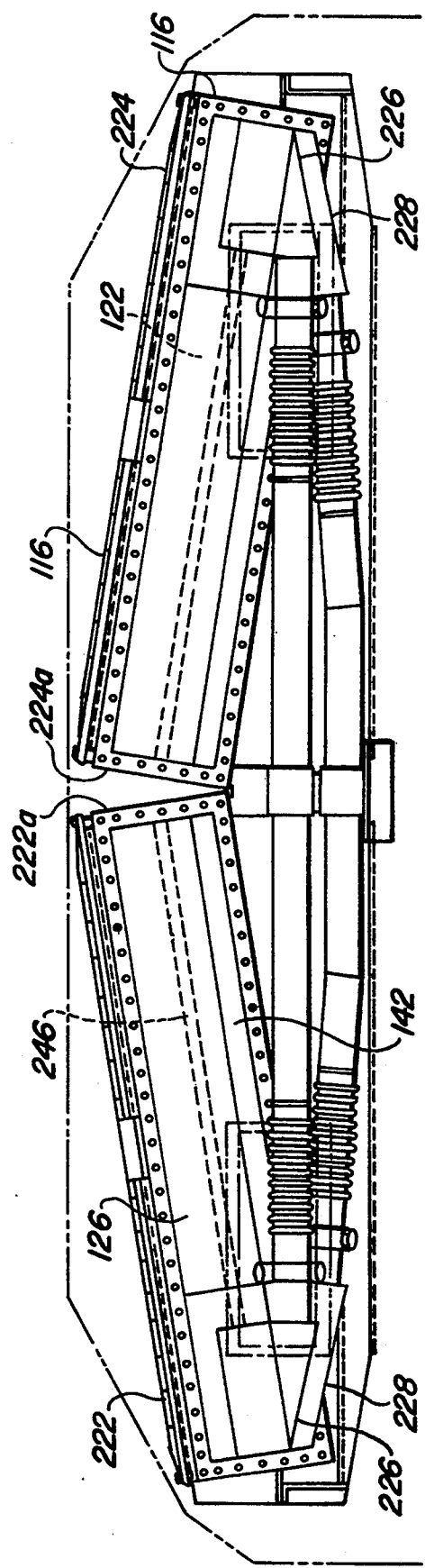
FIG. 5 is an elevational end view of a composite radiator forming a part of the heat regulating system of FIGS. 2-5.

Referring to FIG. 5, the preferred embodiment of the composite radiator 116 is illustrated. The composite radiator 116 is preferably arranged in a separate left half section 222 and right half section 224. The left section 222 and the right section 224 extend longitudinally along the locomotive in a side-by-side relationship. Although the left section 222 and right section 224 are generally horizontally disposed, the inner side 222a of the left section and inner side 224a of the right section are raised so that the left section and right section are upwardly tilted at about a 9° angle to the horizontal. The left section 222 and right section 224 are tilted to facilitate the draining of coolant from the composite radiator 116 when the system 100 is operating in the dry mode.

Both the left section 222 and right section 224 of the composite radiator 116 include a pair of sumps 226, 228 to provide an outlet for the coolant flowing through the composite radiator 116 and are shaped so that the coolant may be completely drained from the composite radiator 116 when the system 110 operates in the dry mode.

Figure 6:
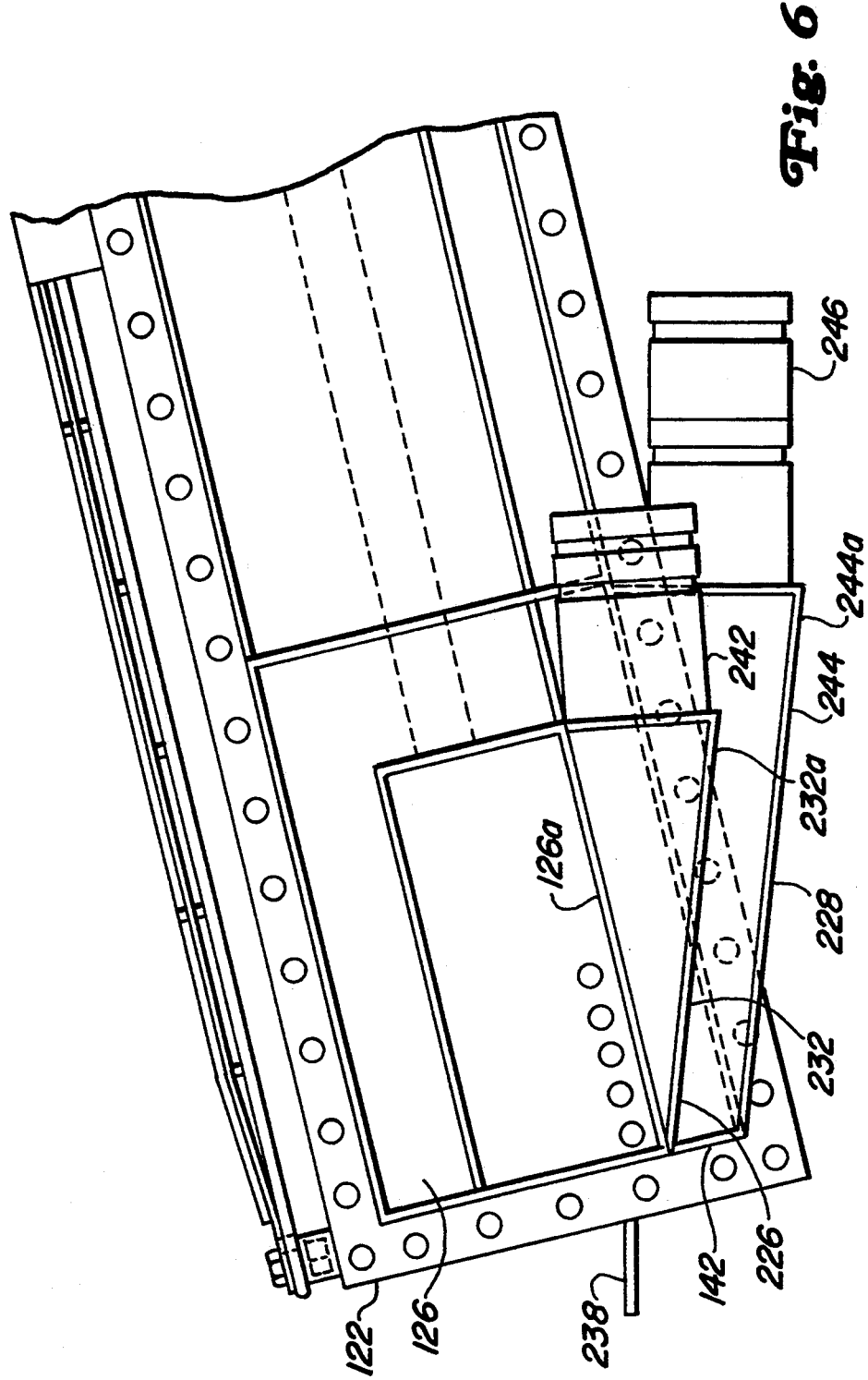
FIG. 6 is an enlarged view of a portion of FIG. 5.

Referring to FIG. 6, in conjunction with FIG. 5, a first sump 226 is disposed on the rear outer corner of each of the left and right half sections 222, 224 and includes a catch well 232 generally formed in the shape of a right triangle with the hypotenuse aligned with the lower surface 126a of the end manifold 126. To insure the well 232 is drained even though the half section is inclined, the lower surface 232a of the well is angled so that as the lower surface extends inward, the lower surface is downwardly inclined relative to the horizontal, denoted at 238. An outlet conduit 242 extends generally outward from the inner side 232b of the well. The outlet conduit 242 is in fluid communication with the coolant tank 134 (FIG. 2). The well 232 is in fluid communication with the end manifold 126 which, as noted previously, provides fluid communication between the upper primary radiator 122 and upper section 128 of the subcooler 132.

The second sump 228 acts to provide an outlet for the subcooler 132 and to insure the subcooler is completely drained when the system 10 is in the dry mode. The second sump 228 is disposed on each of the rear outer corners of the lower section 142 of the subcooler 132 and includes a catch well 244 shaped similarly to the catch well of the first sump 226 with the hypotenuses aligned with the lower surface 132a of the subcooler 132. The lower surface 244a of the catchwell 244 is downwardly inclined relative to the horizontal 238. The second sump 244 also includes an outlet conduit 246 which extends inward from the inner surface 226a of the well. The outlet conduit 246 is in fluid communication with the second two way valve 206 and second three way valve 244.

Figure 7:
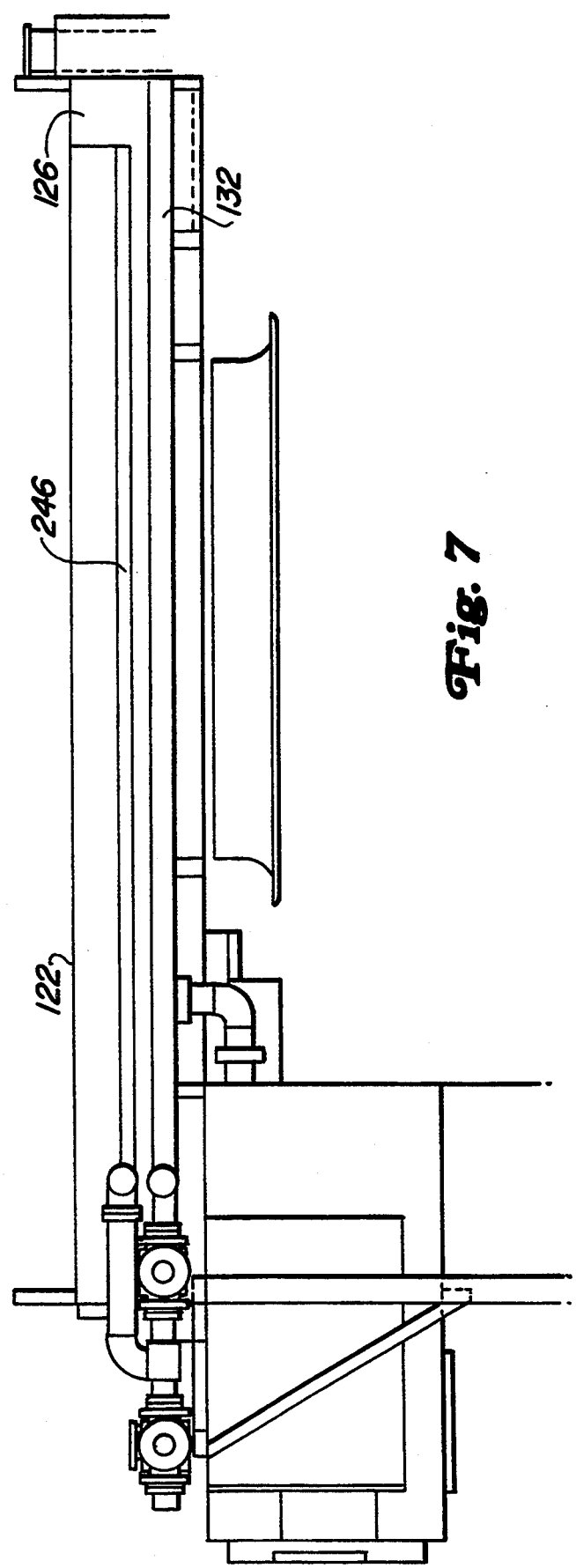
FIG. 7 is a side view of the composite radiator and coolant tank forming a portion of the heat regulating system of FIGS. 2-4.

Referring to FIG. 7, in conjunction with FIG. 5, the left half section 222 and right half section 224 of the composite radiator 116 each include the primary radiator 122 which is generally planar and has a rectangular periphery. Also included is the sub-cooler 132 which is aligned with and shaped similarly to the primary radiator 122. The sub-cooler 132 is disposed beneath the primary radiator 122 and is separated from the primary radiator by an air space 246.

The space 246 performs several functions. First the air separation space 246 provides for air redistribution after the air has been initially forced through the subcooler. Redistribution provides better heat transfer by acting to eliminate hot and cold areas. A second function provided by the air separation space 246 is to facilitate the cleaning of the radiator 116. Locomotive radiators are typically cleaned by passing the locomotive beneath a high powered water jet which forces cleaning water through the radiator. The air separation space 246 provides an outlet drain for the water which has been forced through the primary radiator 122. Thus, the dirt and other foreign elements which have collected on the primary radiator may be washed from the primary radiator 122 without having to be forced through the subcooler 132 also.

Referring back to FIG. 2, the heat regulating system 100 may also include a number of sensors to provide temperature input to the controller 110. Included in the sensors is an ambient air sensor 252 which is preferably disposed to read the temperature of the ambient air after the air has been discharged through the blower but before the air flows through the subcooler 132. Also included is an engine water temperature sensor (EWT) 254 which is preferably mounted adjacent the coolant inlet to the engine 104 to sense the temperature of the coolant entering from the engine.

Another temperature sensor providing input to the controller is an engine oil temperature sensor (LOT) 256 which senses the temperature of the oil coming form the engine. The heat regulating system 100 may also include a charger cooler coolant temperature sensor (IWT) 258 which senses the temperature of the coolant after the charger cooler.

FIGS. 8'-8h depict a method for controlling the split heat regulating system 100 in accordance with the invention. Referring to FIG. 8a, a general overview of the method for controlling the heat regulating system 100 is illustrated. The method may start as indicate in block 300. Also referring to FIG. 2, upon initiation, the electronic controller 110 sets the value for an ambient strategy equal to high and sets a value for a notch strategy equal to high as indicated in block 302. The electronic controller 110 then determines which sensed temperature value represents the temperature of the coolant as indicated by block 304.

Figure 8A:
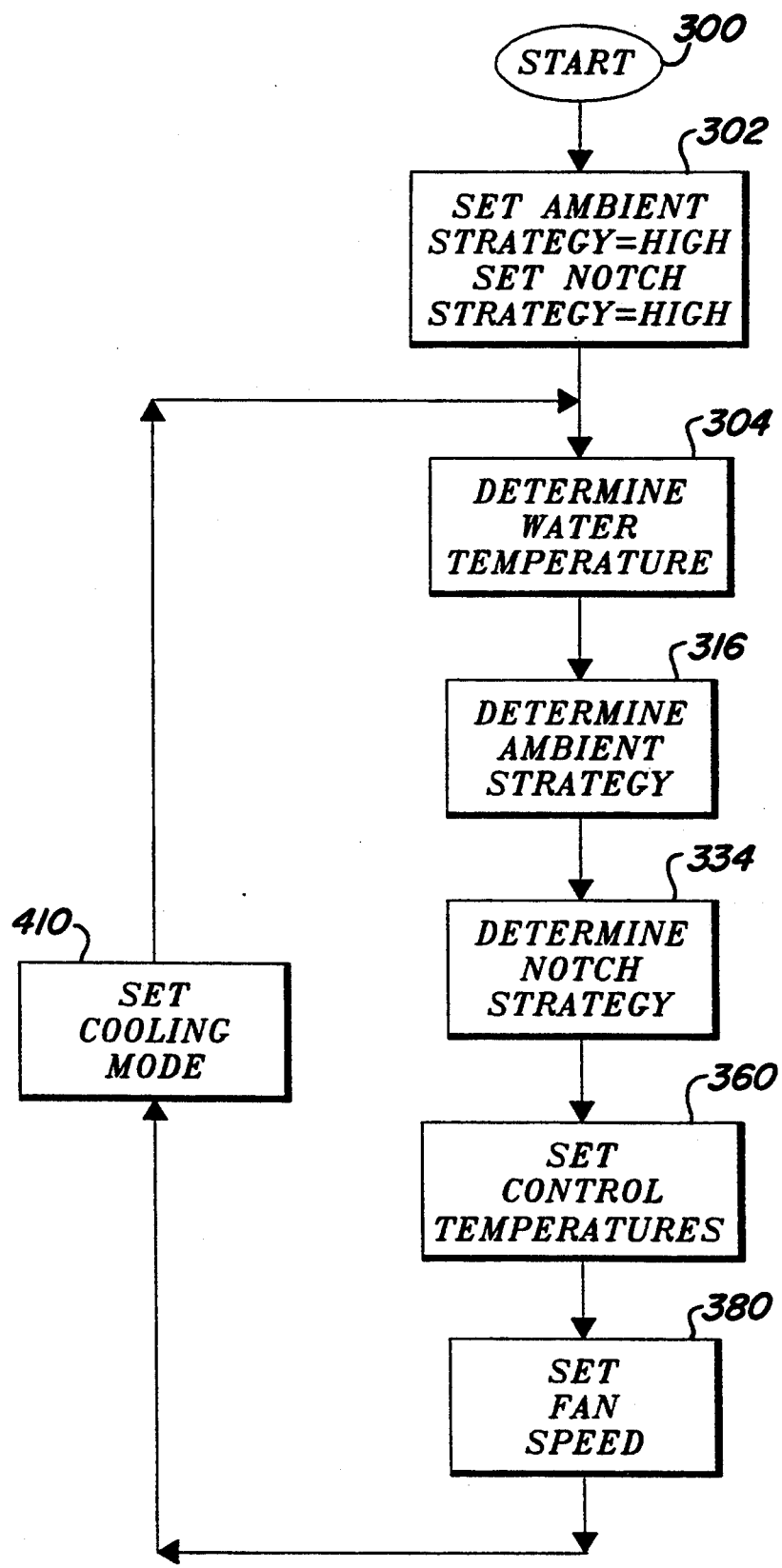
FIGS. 8a-8h are flow diagrams generally depicting a method for operating the heat regulating system of FIGS. 2-4 in accordance with the invention.
Figure 8B:
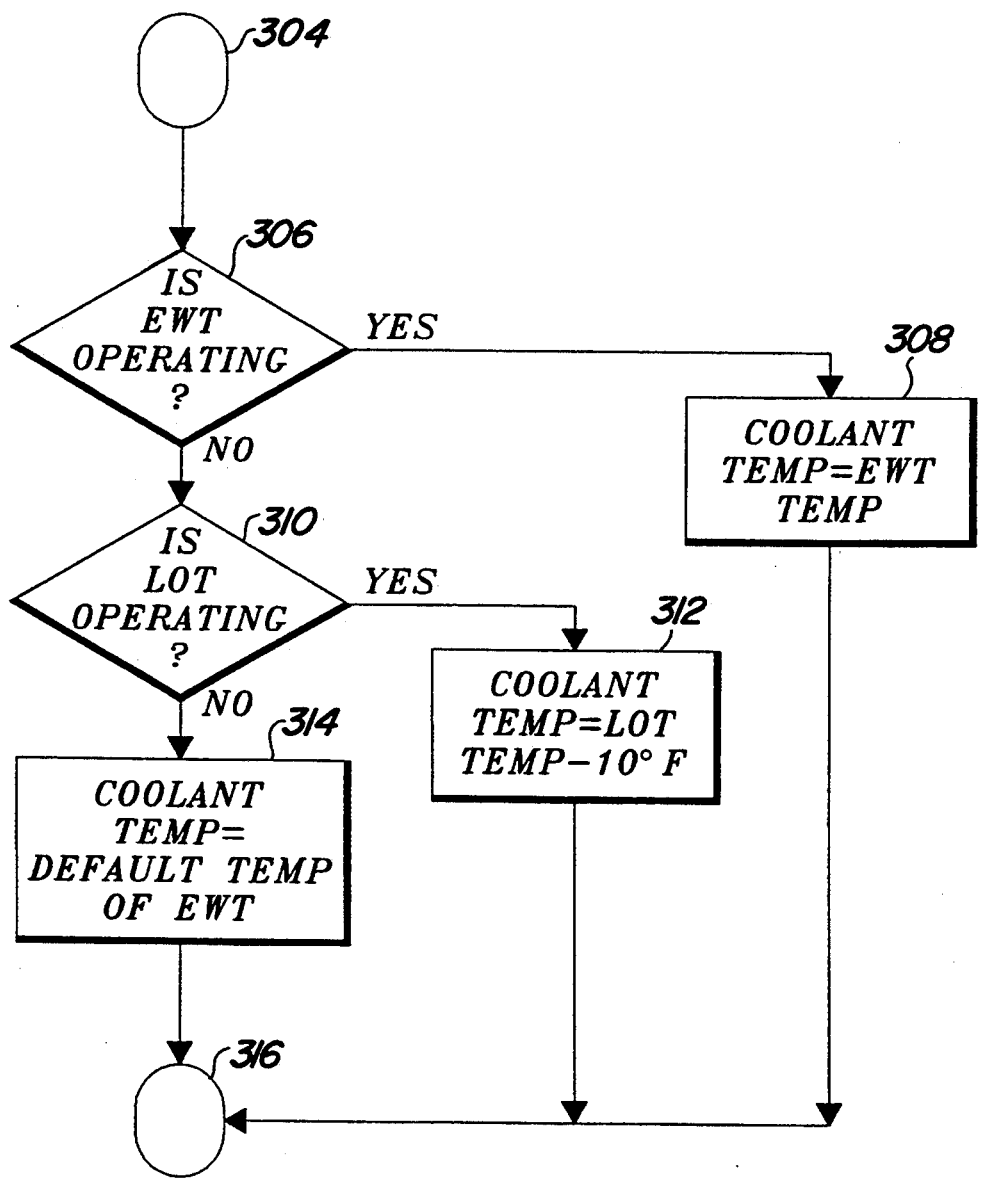

Referring to FIG. 8b, a flowchart for determining the representative coolant temperature, as illustrated by block 304 in FIG. 8a, is illustrated. The controller 110 first determines whether the engine water temperature (EWT) sensor 254 is operating as indicated by block 306. If the EWT sensor 254 is operating, the coolant temperature is set equal to the temperature registered by the EWT sensor as indicated by block 308. If the EWT sensor 254 is not operating, the controller determines if the engine oil temperature sensor (LOT) 256 is operating, as indicate by block 310. If the LOT sensor 256 is operating, the controller 110 sets the coolant temperature in some relation to the temperature as sensed by the LOT sensor 256 such as being equal to the LOT temperature reading minus a predetermined degree differential, preferably 10° fahrenheit, as indicated by block 312. If the LOT is not operating, the controller 110 sets the coolant temperature to the default temperature of the EWT sensor 254 as indicated in block 314.

Referring back to FIG. 8a, after the controller 110 has determined the representative coolant temperature, the controller next determines the ambient strategy as indicated by block 316. Generally the controller 110 determines the ambient strategy to account for the differing cooling capability of cool ambient air being forced by the fan 124 through the composite radiator 116 versus the lower cooling capability of warmer ambient air being forced through the radiator.

Figure 8C:
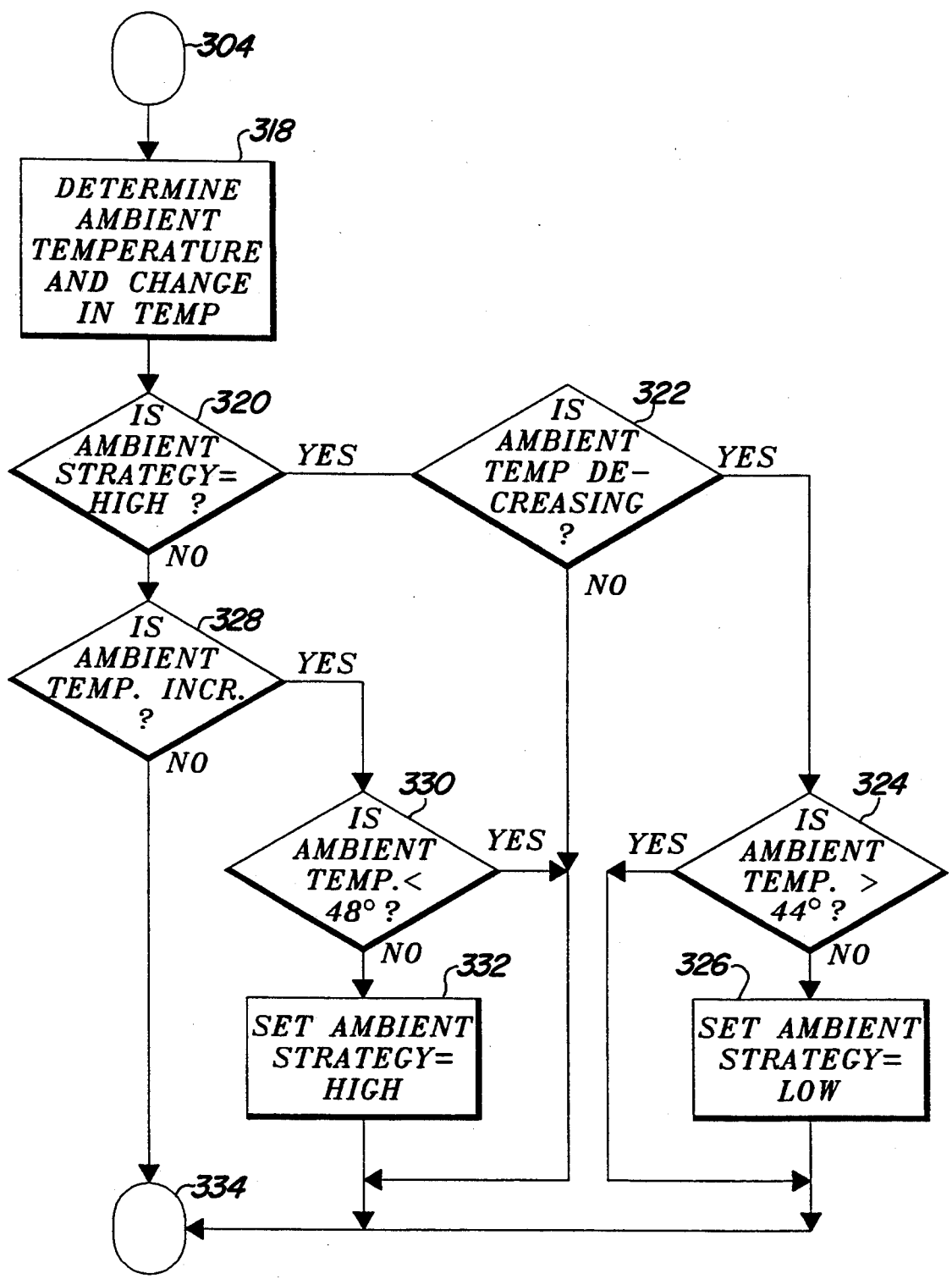

Referring to FIG. 8c, the flowchart for setting the ambient strategy, as indicated by block 316 in FIG. 8a, is illustrated. The controller 110 first determines the ambient temperature by evaluating the input signal from the ambient temperature sensor 252 as indicated by block 318. The controller 110 stores the sensed ambient temperature and calculates whether the ambient temperature is increasing or decreasing also is indicated by block 318. The controller may do this by storing past ambient temperature readings in a register (not shown) or other data storage device and performing an analysis on the stored readings.

The controller then determines whether the ambient strategy is set to high strategy as indicated by block 320. If the ambient strategy is set to high strategy, the controller then determines if the ambient temperature is decreasing as indicated by block 322. If the ambient temperature is decreasing, the controller then determines if the sensed ambient temperature is greater than a predetermined degree, such as 44° fahrenheit as shown in block 324. If the ambient temperature is greater than 44° fahrenheit, the controller makes no change in the ambient strategy thus leaving the strategy equal to high. If the ambient temperature is less or equal to 44° fahrenheit, the controller 110 sets the ambient strategy equal to low as indicated in block 326.

Referring back to block 322, if the ambient temperature is not decreasing or increasing and the ambient strategy is equal to high, the controller 110 makes no change thus keeping the ambient strategy equal to high.

Referring back to block 320, if the ambient strategy set to a low strategy, the controller 110 then determines if the ambient temperature is increasing as indicate by block 328. If the ambient temperature is not increasing, the controller 110 makes no change in the ambient strategy leaving the ambient strategy equal to low. If, however, the ambient temperature is increasing, the controller 110 next determines if the ambient temperature is less than a predetermined temperature, preferably 48° fahrenheit as indicated in block 330. If the ambient temperature is less than 48° fahrenheit, the controller makes no change in the ambient strategy thus keeping the ambient strategy equal to low. If, however, the ambient temperature is greater than or equal to 48° fahrenheit the controller sets the ambient strategy equal to high as indicated by block 332.

Referring back to FIG. 8a, after determining the ambient strategy, the controller 110 then determines the notch strategy, as indicated by block 334. Generally the controller 110 determines the notch strategy to account for the observation that when the engine 104 is operating at higher power levels more heat is being generated by the engine and therefore the temperature of the coolant exiting the engine cooling circuit is expected to rise.

Figure 8D:
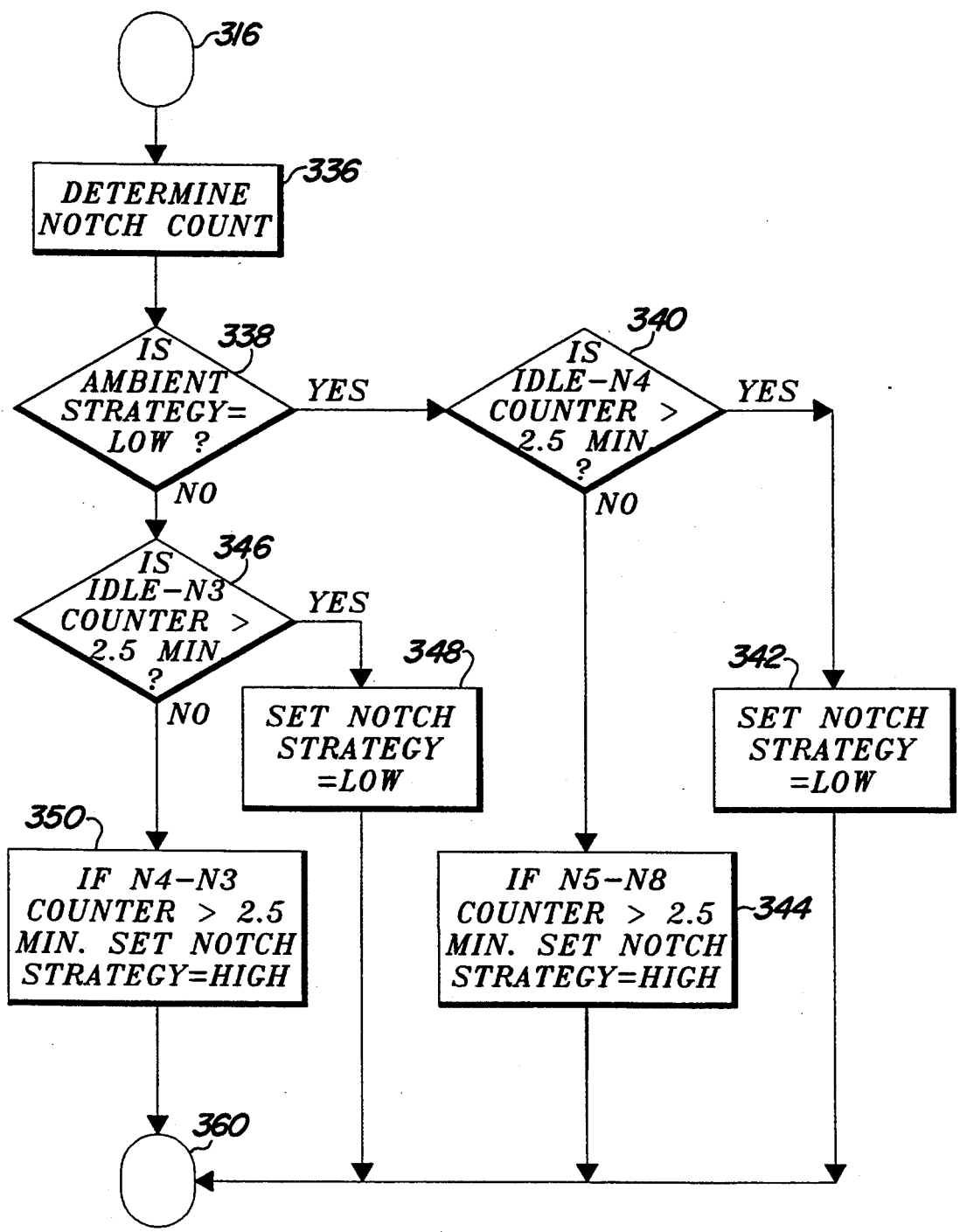
Figure 8E:
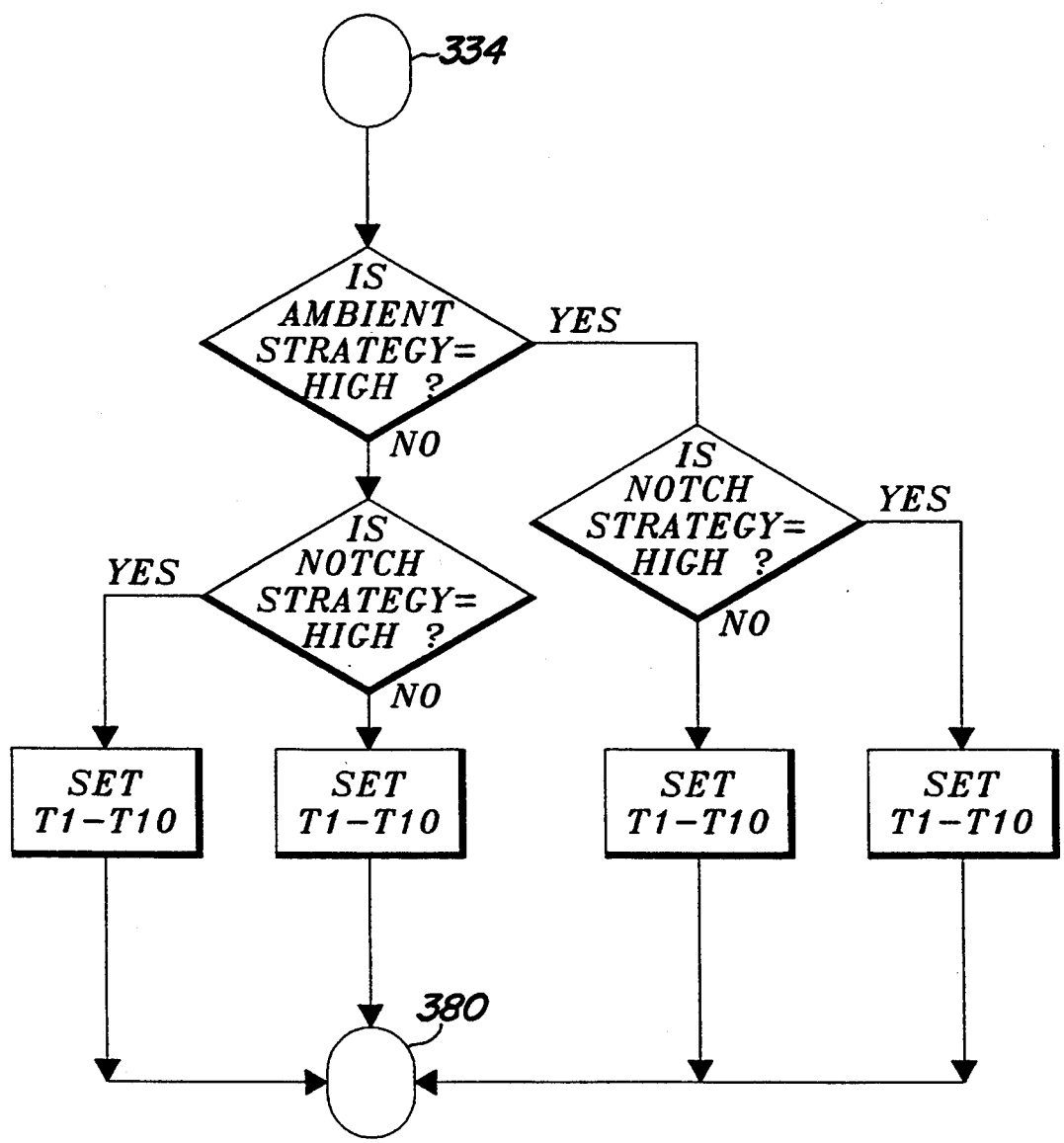

Referring to FIG. 8d, a flowchart for determining the notch strategy, as indicated by block 334 in FIG. 8a, is illustrated. The controller first determines the notch count as indicated by block 336. To determine the notch count, the locomotive 1 is preferably equipped with a set of notch counters (not shown) preferably four in number. As is well known, locomotives typically operate on one of several different power settings or notches. In the preferred embodiment the number of notches is nine. The notch settings being denoted to include an idle and notch 1 through notch 8.

A first counter of the notch counters determines the time within the last 5 minutes during which the locomotive was operating between the notches of idle and notch 3. A second counter determining within the last 5 minutes the amount of time the locomotive was operating between notch 4 and notch 8. A third counter determining the time within the last 5 minutes that the locomotive was operating between idle and notch 4 and a fourth counter for determining within the last 5 minutes the time the locomotive was operating between notch 5 and notch 8.

After the controller 110 has determined the notch count, the controller then determines whether the ambient strategy is set to low, as indicated by block 338. If the ambient strategy is set to low, thus indicating the cooling capability of the air flowing through the radiator is relatively high, the controller 110 then determines whether the third counter indicates a time greater than 2.5 minutes as indicate in block 340. If the third counter shows a time greater than 2.5 minutes, the controller sets the notch strategy equal to low as indicated in block 342. If instead, the fourth counter shows a time greater 2.5 minutes, the controller 110 sets the notch strategy equal to high as indicated in block 344.

Referring back to block 338, if the ambient strategy is not set to low, or is set to high, thus indicating the cooling capability of the air flowing through the radiator is lower than if the ambient strategy is equal to low, the controller then determines whether the first counter shows a time greater than 2.5 minutes as indicated in block 346. If the first counter shows a time greater than 2.5 minutes, the controller 110 sets the notch strategy equal to low as indicated in block 348. If instead, the second counter shows a time greater than 2.5 minutes, the controller 110 sets the notch strategy equal to high as indicated by block 350.

As is apparent from the above description of setting the notch strategy, the controller 110 sets the notch strategy equal to high if the engine 104 is operating at a lower power level, for example notch 4, and the ambient strategy is equal to high. In contrast, if the ambient strategy is equal to low and the locomotive is operating on notch 4, the controller 110 sets the notch strategy equal to low to reflect the higher cooling capability of the cooler air as represented in the low ambient strategy setting.

Referring back to FIG. 8a, after the controller 110 has determined the notch strategy as indicated in block 334, the controller then sets control temperatures T1 -T10 as indicated by block 360. Referring to FIG. 8c, a flowchart for setting the control temperatures, as indicated by block 360 in FIG. 8a, is illustrated. In setting the control temperatures, the controller first determines which of the four possible strategies the system is in i.e., high ambient strategy with a high notch strategy, low ambient strategy with a low notch strategy, etc. Then the controller 110 determines the control temperatures by accessing a data storage device such as a read only memory for that particular ambient-notch strategy combination. Thus, for example, if the ambient strategy is equal to high and the notch strategy is equal to low, the controller 110 will set the control temperatures T1 -T10. If, however, the ambient strategy is equal to high and the notch strategy is equal to low, the controller 110 will set a different set of control temperatures T1 -T10. The different sets of control temperatures for the various combinations of ambient strategy and notch strategy will act to cause the controller 110 to operate the fan speed and cooling system mode at different settings for the same coolant temperature to reflect the cooling capability of ambient air at different temperatures and the heat output of the engine 104 at different power levels.

Referring to FIG. 9, a chart of examples of the various control temperatures T1 -T10 which are set by the controller 110 for the different strategies is set forth. Obviously, the chart is for example only as various configurations of engines and heat regulating systems require different control temperatures to regulate the engine temperature and charger air cooler temperature to maintain the optimal range for these temperatures.

Figure 8F:
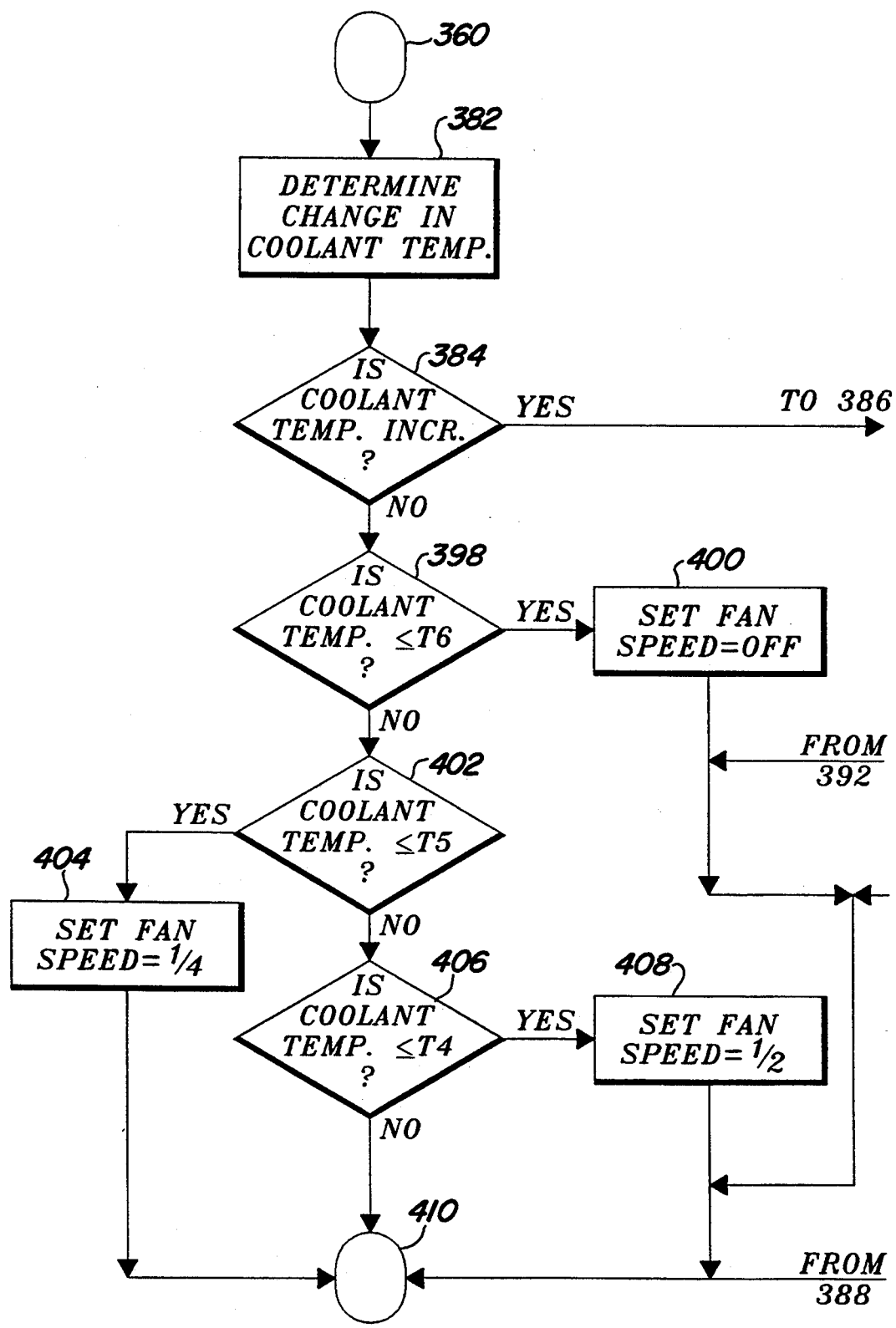

Referring back to FIG. 8a, after the controller 110 has set the control temperatures T1 -T10 the controller 110 then sets the speed of the fan 154 as indicated in block 380. Referring to FIG. 8f, a flowchart illustrating the method for determining and setting the speed of the fan 154, as indicated by block 380 in FIG. 8a, is illustrated. The controller 110 may start by determining the change in coolant temperature as indicated by block 382. The controller 110 preferably determines the change in the coolant temperature by storing coolant temperatures determined in step 304 in a register (not shown). The controller 110 then refers back to stored coolant temperatures in the register to determine the change in the coolant temperature.

As represented in block 384, the controller 110 then determines whether the change in the coolant temperature indicates an increasing or decreasing coolant temperature. If the coolant temperature is increasing, the controller 110 then determines whether the coolant temperature is greater than a T3, which is one of the control temperatures set in step 360 as indicated in block 386. If the coolant temperature is greater than or equal to T3, the controller 110 then provides a control signal to set the fan speed equal to full as indicated by block 388. If the controller 110 determines that the coolant temperature is not greater than or equal to T3, the controller then determines whether the coolant temperature is greater than or equal to control temperature T2, as shown in block 390. If the coolant temperature is greater than or equal to T2, the controller 110 provides a control signal to set the fan speed equal to one half as indicated in block 392.

If the coolant temperature is less than T2, the controller 110 then determines whether the coolant temperature is greater than or equal to T1 as indicated in block 394. If the coolant temperature is greater than T1, the controller 110 sets the fan speed equal to one quarter. If, however, the coolant temperature is less than T1, the controller 110 makes no change in the fan speed.

Referring back to block 384, if the coolant temperature is not increasing, the controller 110 then determines if the coolant temperature is equal to or less than a T6 temperature as indicated in block 398. If the coolant temperature is less than or equal to T6, and the coolant temperature is decreasing, the controller 110 provides a control signal to set the fan speed equal to off as indicated in block 400. If, however, the coolant temperature is not less than or equal to a T6, the controller then determines if the coolant temperature is less than or equal to a T5 as indicated in block 402, T5 being greater than T6. If the controller 110 determines that the coolant temperature is less than or equal to T5, the controller provides a control signal to set the fan speed equal to one quarter as indicated by block 404. If, however, the controller 110 determines that the coolant temperature is greater than T5, the controller then determines whether the coolant temperature is less than or equal to a T4, as indicated in block 406. The control temperature T4 being greater than the control temperature T5. If the controller 110 determines that the coolant temperature is less than or equal to T4, the controller provides a control signal to set the fan speed equal to one half as indicated in block 408. If instead, the coolant temperature is greater than T4, the controller makes no change in the fan speed.

Figure 8G:
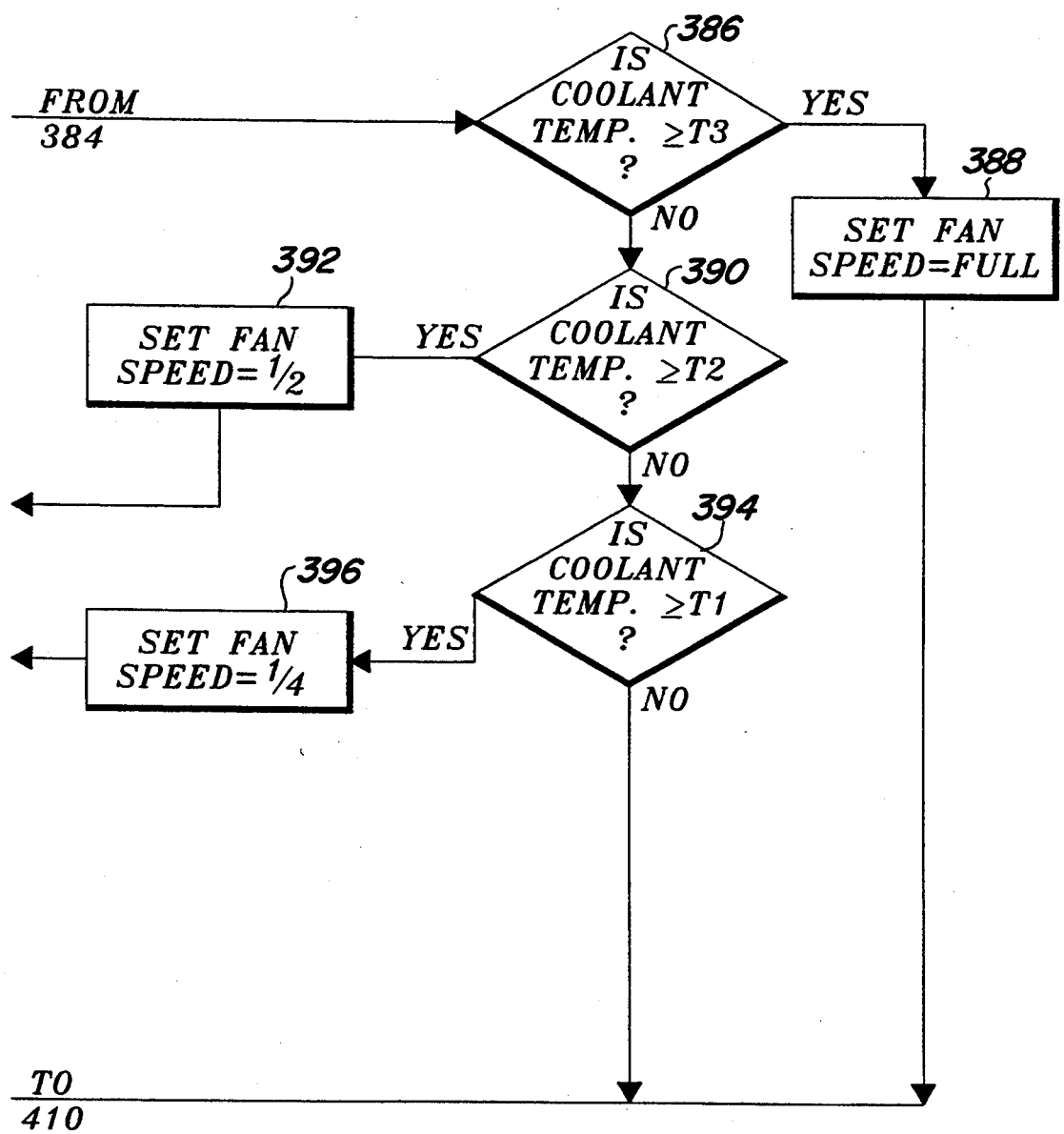
Figure 8H:
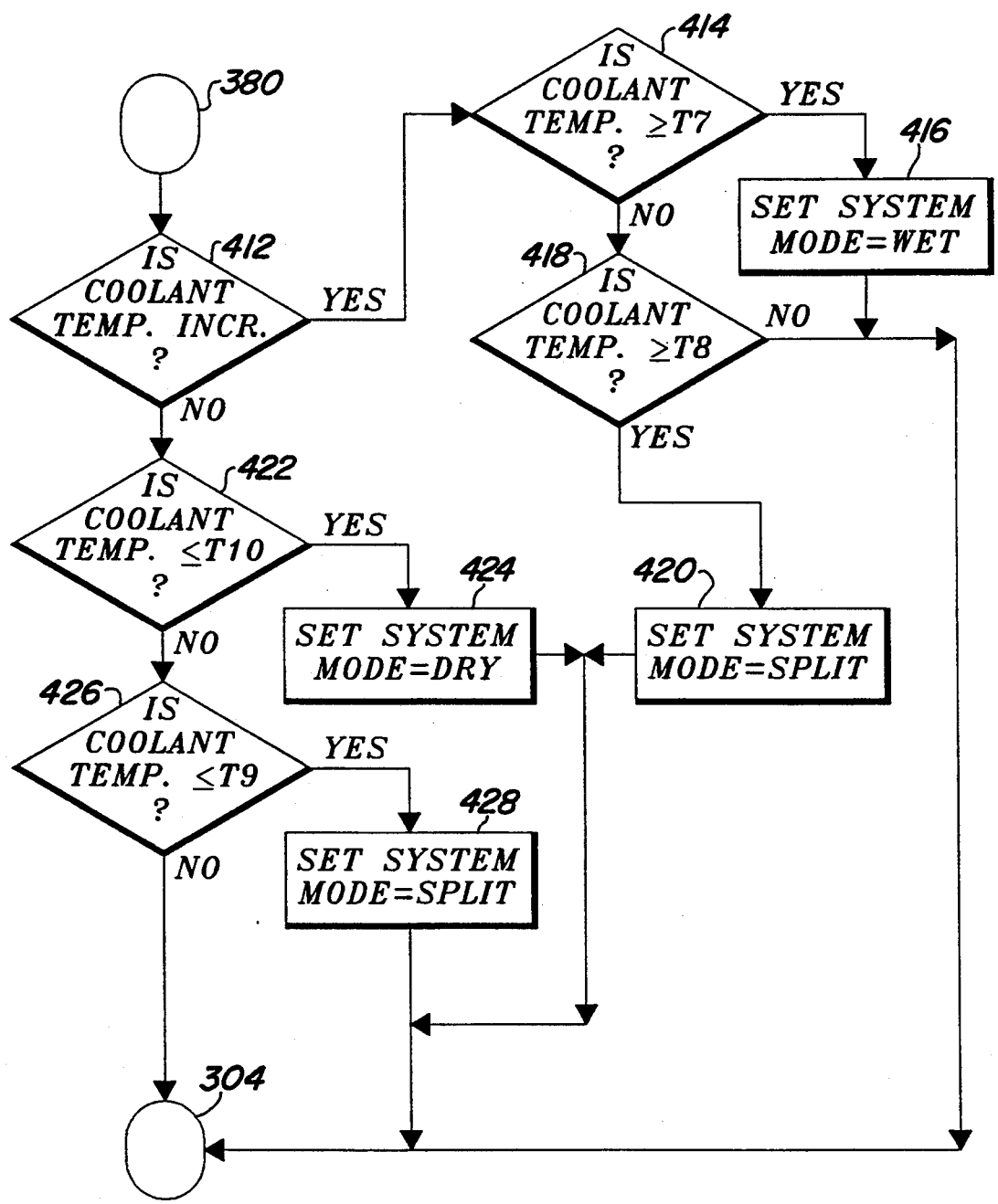

Referring back to FIG. 8a, after the controller has set the fan speed as shown in step 380, the controller then sets the mode of the heat regulating system as indicated in block 410. Referring to FIG. 8g, a method for determining and setting the heat regulating system mode is illustrated.

The method may start by the controller 110 determining whether the coolant temperature is increasing as indicated in block 412. If the coolant temperature is increasing, the controller 110 next determines if the coolant temperature is greater than or equal to a control temperature T7 as shown in block 414. If the coolant temperature is greater than or equal to T7, the controller 110 provides control signals to set the heat regulating system mode equal to wet as indicated in block 416. If instead, the controller 110 determines the coolant temperature is less than T7, the controller next determines if the coolant temperature is greater than or equal to a T8 as indicated in block 418. The control temperature T8 being less than control temperature T7. If the controller 110 determines that the coolant temperature is greater than or equal to T8, but less than T7, the controller 110 provides control signals to set the system mode equal to split as shown in block 420. If the coolant temperature is less than T8 the controller 110 makes no change in the system mode.

Referring back to block 412, if the controller determines that the coolant temperature is not increasing or is instead decreasing, the controller 110 then determines if the coolant temperature is less than or equal to a control temperature T10 as indicated in block 422. If the controller 110 determines that the coolant temperature is less than or equal to T10, the controller then provides control signals to set the system mode equal to dry as indicated in block 424. If instead, the controller determines the coolant temperature is greater than T10, the controller then determines if the coolant temperature is less than or equal to T9 as shown in block 426. Control temperature T9 being greater than control temperature T10. If the controller 110 determines that the coolant temperature is less than or equal to T9, the controller provides control signals to set the system mode equal to split as indicated in block 428. If the coolant temperature is greater than T9, the controller makes no change in the system mode.

Referring back to FIG. 8a, after the controller 110 has set the heat regulating mode 410, the controller may return to step 304 to determine the coolant temperature and the method for controlling the split heat regulating system is repeated.

Preferably independent of setting the fan speed and system mode, the controller 110 checks to determine whether the charger cooler 148 is overheating. This overheating may occur when the first three way valve 112 and/or second three way valve 144 becomes stuck in a closed position, thus preventing the flow of coolant through the radiator 116 and thus the charger cooler 148 or the charger cooler 148 alone. If the temperature in the charger cooler 148 gets above a temperature which vaporizes the coolant such as a boiling temperature, the coolant may boil out of the charger cooler creating damage.

Figure 10:
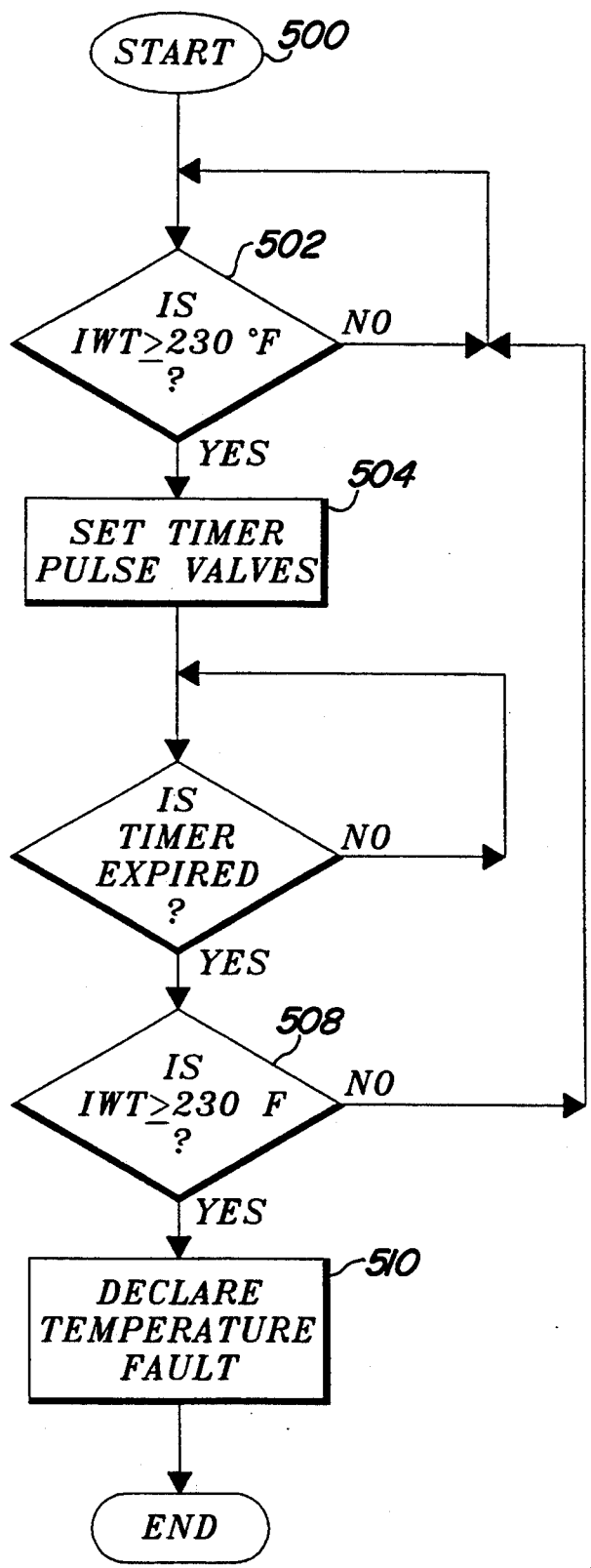
FIG. 10 is a flowchart illustrating the method for preventing the overheating of the charger cooler.

Referring to FIG. 10, a flowchart illustrating the method for preventing the overheating of the charger cooler 144 is set forth. The method may start as indicated at 500. The controller 110 reads the signal input from the charger cooler coolant temperature sensor (IWT) 258 and determining whether the temperature signal is greater than or equal to a predetermined temperature such as 230° fahrenheit as indicated by block 502. If the temperature of the coolant in the charger cooler 148 is less than 230° fahrenheit, the controller 110 may continue sampling the input from the IWT sensor and act when an over temperature is detected.

If the coolant temperature as sensed by the IWT 258 is greater than or equal to 230° fahrenheit, the controller 110 may set a time period using an internal clock and provides control signals to pulse the first and second three way valves 112 and 144 in an attempt to loosen the valves as indicated in block 504. The controller 110 then checks to see if the time has expired on the timer as indicated in block 506. If the time has expired, the controller then determines if the coolant is greater than 230° fahrenheit as indicated by block 508. If the time has not expired, the controller continues counting.

If the coolant temperature is greater than 230° and the time period has expired, the controller 110 then declares an over-temperature fault as indicated in block 510. Upon declaring the over-temperature fault, the controller may provide control signals to activate an alarm, send a visual message to the operator and cause the locomotive to operate either in idle or notch one until the temperature of the coolant in the inner cooler goes below 230° fahrenheit.

A specific embodiment of the novel split heat regulating system for turbo charged internal combustion engine and control system according to the present invention has been described for the purposes of illustrating the manner in which the invention may be made and used. It should be understood that implementation of other variations and modifications of the invention in its various aspects will be apparent to those skilled the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A temperature regulating system for a turbo charged internal combustion engine with a turbo charger means for providing compressed air to the engine, coolant for transferring heat from the engine, radiator means in fluid communication with the engine for exchanging heat with the coolant which flows through the radiator means, fan means for forcing air into contact with the radiator means, and a charged air cooler means for exchanging heat between the coolant and the compressed air from the turbo charger means, the system comprising:

subcooler means in fluid communication with the radiator means for cooling a portion of the coolant exiting the radiator means;

means for distributing the flow of coolant from the engine among at least one of a plurality of flow paths, the flow paths including a first flow path between the engine and the radiator means and a second flow path between the engine and the air cooler means without the coolant flowing through the radiator, the distributing means including, first valve means for regulating a first flow of coolant from the engine along the first flow path to the engine, second valve means for regulating a second flow of coolant along the second flow path; and control means for actuating the second valve means in response to the temperature of the coolant at a predetermined location along the heat regulating system.

2. The heat regulating system of claim 1 further including means for actuating the first valve in response to the temperature of the coolant at a predetermined location along the heat regulating system.

3. The heat regulating system of claim 2 wherein the control means includes the first valve actuating means.

4. The heat regulating system of claim 1 further including means for regulating the speed of the fan in response to the temperature of the coolant at a predetermined location along the heat regulating system.

5. The heat regulating system of claim 4 wherein the fan speed regulating means includes means for regulating the speed of the fan in response to the ambient temperature.

6. The heat regulating system of claim 4 wherein the control means includes the fan speed regulating means.

7. The heat regulating system of claim 4 wherein the fan speed regulating means includes means for regulating a speed of the fan means in response to the power output of the engine.

8. The heat regulating system of claim 1 wherein the control system means includes means for actuating the second valve in response to the power output of the engine.

9. The heat regulating system of claim 1 wherein the control system means includes means for actuating the second valve in response to the ambient temperature.

10. The heat regulating system of claim 1 wherein the first valve means includes means for preventing the flow of coolant to the radiator means in response to the ambient temperature.

11. The heat regulating system of claim 1 wherein the first valve means includes means for preventing the flow of coolant to the radiator means in response to the power output of the engine.

12. The heat regulating system of claim 1 further including means in fluid communication with the radiator for draining the radiator means when the first valve means prevents the flow of coolant along the first flow path.

13. The heat regulating system of claim 1 wherein the first flow path includes coolant flowing through the radiator and further including means for proportioning the first flow exiting the radiator means into a plurality of flow paths, the plurality including a third flow path from the radiator through the subcooler.

14. The heat regulating system of claim 13 wherein the third flow path includes a flow path between the subcooler means and the charger cooler means and the second valve means includes means for regulating the flow of coolant along the third flow path.

15. The heat regulating system of claim 1 wherein the distributing means includes means for proportioning the flow of coolant exiting the engine, between the first flow path and the second flow path.

16. A heat regulating system for an internal combustion engine having a turbo charger means for providing compressed air to the engine, coolant for transferring heat from the engine, radiator means for exchanging heat with the coolant which flows through the radiator means, fan means for forcing air into contact with the radiator means, coolant tank means for collecting the coolant flowing from the engine and a charged air cooler means for exchanging heat between the coolant and the compressed air from the turbo charger means, the system comprising:

first valve means for regulating a first flow of the coolant between the engine and the radiator means;

a subcooler radiator means in fluid communication with the radiator means for cooling at least a portion of the first flow of coolant exiting from the radiator means;

second valve means for regulating a second flow of coolant between the engine and the air cooler means, the second flow bypassing the radiator means; and control system means including,
means for actuating the second valve means in response to the temperature of the coolant at a predetermined location along the heat regulating system, means for actuating the first valve in response to the temperature of the coolant at the predetermined location along the heat regulating system, and means for regulating the speed of the fan in response to the temperature of the coolant at the predetermined location along the heat regulating system.

17. A method for regulating the temperature of a turbo charged internal combustion engine and compressed air provided to the engine by a turbo charger means with a system having coolant for transferring heat from the engine, radiator means in fluid communication with the engine for exchanging heat with the coolant which flows through the radiator means, fan means for forcing air into contact with the radiator means, and a charged air cooler means for exchanging heat between the coolant and the compressed air from the turbo charger means, the method comprising:

flowing the coolant through the engine;

distributing the flow of coolant exiting the engine among at least one of a plurality of flow paths, the flow paths including a first flow path from the engine through the radiator means and a second flow path between the engine and the air cooler means, the second flow path bypassing the radiator, the distributing including, regulating a first flow of coolant from the engine along the first flow path, the regulating including actuating a first valve means, cooling a portion of the flow of coolant exiting the radiator means, the cooling including passing the portion through a subcooler means, the subcooler means being in fluid communication with the radiator means, and regulating a second flow of coolant along the second flow path, the regulating including actuating a second valve means, and providing a control signal to actuate the second valve means in response to the temperature of the coolant at a predetermined location along the heat regulating system.

18. The method of claim 17 further including regulating the speed of the fan in response to the temperature of the coolant at the predetermined location along the heat regulating system, the distributing including providing a control signal to actuate the first valve in response to the temperature of the coolant at the predetermined location along the heat regulating system.

* * * * *